July 29, 1958 K. MÜLLER 2,845,493
CONTROL OF TELEPHONE SWITCHES HAVING PLURALITY
OF SIMULTANEOUSLY OPERATED SETS OF WIPERS
Filed March 28, 1955 2 Sheets-Sheet 1

Inventor:
Konrad Müller.
By [signature] Atty.

July 29, 1958 K. MÜLLER 2,845,493

CONTROL OF TELEPHONE SWITCHES HAVING PLURALITY OF SIMULTANEOUSLY OPERATED SETS OF WIPERS

Filed March 28, 1955 2 Sheets-Sheet 2

Inventor:
Konrad Müller

By [signature] Atty.

United States Patent Office 2,845,493

Patented July 29, 1958

2,845,493

CONTROL OF TELEPHONE SWITCHES HAVING PLURALITY OF SIMULTANEOUSLY OPERATED SETS OF WIPERS

Konrad Müller, Munich, Germany, assignor to Siemens & Halske Aktiengesellschaft, Munich, Germany, a corporation of Germany Application March 28, 1955, Serial No. 497,290
In Germany November 26, 1949

Public Law 619, August 23, 1954
Patent expires November 26, 1969

14 Claims. (Cl. 179—18)

This invention relates to a circuit arrangement for automatic telephone systems comprising switches provided with a plurality of sets of wipers, preferably two sets, for the purpose of testing a large number of trunks or lines belonging to one and the same group without increasing the stepping speed.

The wiper sets and the bank contacts of the groups of trunks accessible thereto are vertically successively disposed. A testing device comprising test and auxiliary relays is provided for each wiper set. With such an arrangement, there can be simultaneously tested ten or twenty lines of a group (decade) as compared with five or ten lines in prior systems.

The difficulty with this arrangement is that during the simultaneous testing of the two wiper sets for idle trunks only one of the trunks may be seized at one time and the other testing circuit must be blocked. Several solutions for this problem are known. The known arrangements employ circuits in which the two testing circuits control each other by contacts of the test relays, and the preferred seizure of one of the two lines is effected by test relays operating at different speeds, for example by quicker actuation of one test relay, or by contacts on the test relay operating at different speeds, for example trailing contacts and normal contacts.

The mutual control of the testing circuit by the test relays involves uncertainties in the circuit. The condition of different relay operating times or contact operating times of the test relays requires different construction of the corresponding relays or a special adjustment of the contacts; both involve additional costs. Moreover, an arrangement having for example, one relatively slowly operating and one more rapidly operating test relay is technically hardly applicable in the case of high-speed selectors, for example, motor-driven switches, because quick-testing relays must be provided throughout.

The invention proposes a testing circuit which avoids mutual control of the test circuits by the test relays and any special condition regarding the operating times of the relays or contacts. In accordance with the invention, the mutual coordination of the testing circuits is effected by an auxiliary relay or relays, which are controlled by the test relays. When the wipers engage simultaneously several idle trunks, only one of the trunks is switched through.

The above indicated and other objects and features of the invention will be brought out in the course of the description which will be rendered below with reference to the accompanying drawings showing in diagrammatic manner several embodiments.

Underlying all circuits is a high-speed rotary switch, preferably a motor-driven switch having two wiper sets. The motor-driven switch is to operate as group selector, the controlled selection, determined by a series of dial pulses, being followed in known manner by a free selection or hunting in the selected tens group or decade. Since the hunting operations and the corresponding testing operations must be carried out very quickly, in view of the immediately following next series of dial pulses, the arrangement according to the invention is particularly suitable for such selectors because retarding times of the test relays and auxiliary relays are entirely avoided. The figures do not show the known seizure relays and the similarly well-known pulse receiving line relays included in the illustrated circuits of the motor-driven switches. The switches are driven in known manner each by a magnet system comprising two field magnets M1 and M2 disposed perpendicular to each other, between which a Z-shaped armature rotates; the latter drives the wipers through the medium of suitable gear means. The shaft of the motor armature carries a cam which places an associated contact alternately over to the right and to the left, that is, the cam contact is placed to the right when the armature is in front of field magnet M1, and to the left when it is in front of field magnet M2.

Figure 1:
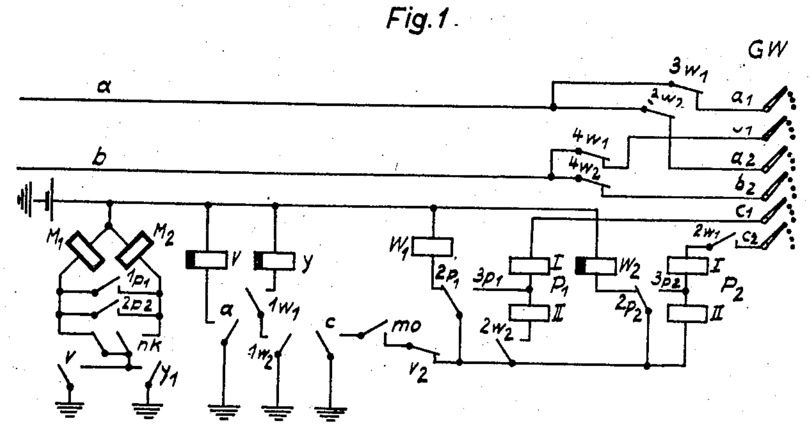
Fig. 1 shows one embodiment of the invention.

The circuit shown in Fig. 1 shall be considered first, keeping in mind the general premises noted above. The seizure relay (not shown) energizes upon seizure of the switch and prepares the circuit for the test relays P1 and P2 and also for the auxiliary relays W1 and W2 through its contact C. The test relay P1, to which is allotted the switching-through relay W1, tests over the test or private conductor associated with the set of wipers *a*1, *b*1, *c*1. The test relay P2, to which is allotted the switching-through relay W2, tests over the test or private conductor associated with the set of wipers *a*2, *b*2, *c*2.

The incoming series of dial pulses causes in known manner pulsing actuation of the pulse receiving line relay (not shown) which controls the contact A to cause energization of the slow-to-release relay V, the latter remaining operated for the duration of the dial pulses and keeping the motor connected at its contact V. The decade selection operations are controlled by switching means (not shown) for example, by special wipers coacting with contacts of the line or impulse relay. The slow-to-release relay V releases after the last pulse and at contact *v*2 connects the auxiliary or switching relays W1 and W2 in circuits extending respectively from +, *c*, off-normal contact *mo*, *v*2, 2*p*1, W1 to —; and from +, *c*, off-normal contact *mo*, *v*2, 2*p*2, W2 to —. The slow-to-release relay Y energizes now in a circuit over the two serially related contacts 1*w*1 and 1w2. Relay Y again connects the motor at its contact *y*1. The switch begins to rotate in free hunting selection until one of the test relays P1 or P2 ascertains the engagement of the respectively cooperating test wiper with the test or private conductor of an idle line. It should be mentioned also that the testing circuit for relay P1 to the private wiper *c* has been closed by contact 2*w*2 of the relay W2 and the testing circuit of relay P2 to the private wiper *c*2 by contact 2*w*1 of the relay W1. If the test relay P1 is first to find an idle trunk over wiper *c*1, it energizes and stops the switch by shunting the two field magnets M1 and M2 over its contact 1*p*1. By opening contact 2*p*1, the test relay P1 disconnects the auxiliary relay W1. At the same time, by closing contacts 3*p*1, the high resistance winding II of the test relay P1 is in known manner shunted and only the low resistance winding I of relay P1 remains in the test circuit, thus busying the seized trunk to seizure from other switches. Upon deenergizing, the auxiliary relay W1 switches the two line or talking conductors *a* and *b* through to the wipers *a*1, *b*1, at the contacts 3*w*1 and 4*w*1, and interrupts the test circuit for relay P2 by opening contact 2*w*1. Relay W2 remains operated and maintains the line or talking conductors disconnected from the wipers *a*2, *b*2.

If the test relay P2 is first to find an idle line, it will energize and stop the switch by short-circuiting or shunting the two field magnets M1 and M2 through contact 1*p*2. At contact 2*p*2 the circuit of the auxiliary relay W2 is interrupted. At the same time, the high resistance winding II of the test relay P2 is shunted at contact 3*p*2, and the seized line is thus in usual manner busied against seizure from other switches. Relay W2 having deenergized, the line conductors are connected through to the wipers *a*2, *b*2, at the contacts 3*w*2 and 4*w*2. At contact 2*w*2 the testing circuit for the test relay P1 is interrupted. Relay W1 remains operated and maintains the two line conductors disconnected from the wipers *a*1, *b*1. Relay Y deenergizes due to opening of contact 1*w*2.

If the two test relays P1 and P2 find idle lines simultaneously over the respectively cooperating private wipers *c*1, *c*2, they will energize simultaneously. Test relay P1 disconnects the auxiliary relay W1 at contact 2*p*1, and test relay P2 disconnects the auxiliary relay W2 at contact 2*p*2. But while test relay P1 is maintained through contact 3*p*1 and its winding I even after opening of the contact 2*w*2, the test relay P2 is caused to deenergize by the opening of the contact 2*w*1. Relay W2 is accordingly energized again over contact 2*p*2. The line conductors are thereby disconnected from the wipers *a*2 and *b*2 and switched through to the wipers *a*1, *b*1 over contacts 3*w*1, 4*w*1 of the deenergized auxiliary or switching control relay W1.

Release of the switch is in known manner effected by the deenergization of the seizure relay (not shown) which interrupts the testing circuits by opening contact *c*.

Figure 2:
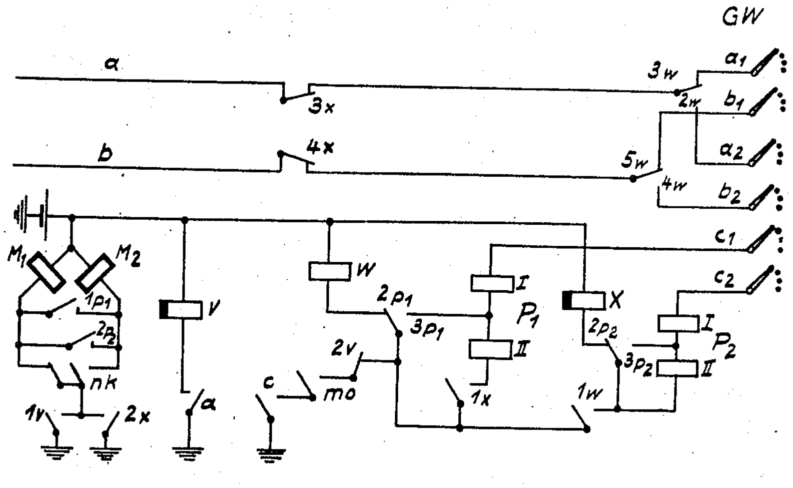
Figs. 2 to 4 illustrate modified embodiments.
Figure 3:
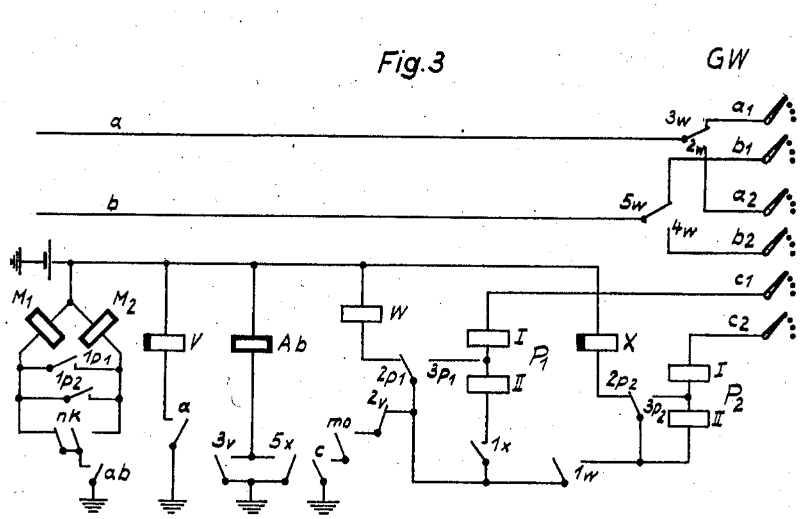
Figure 4:
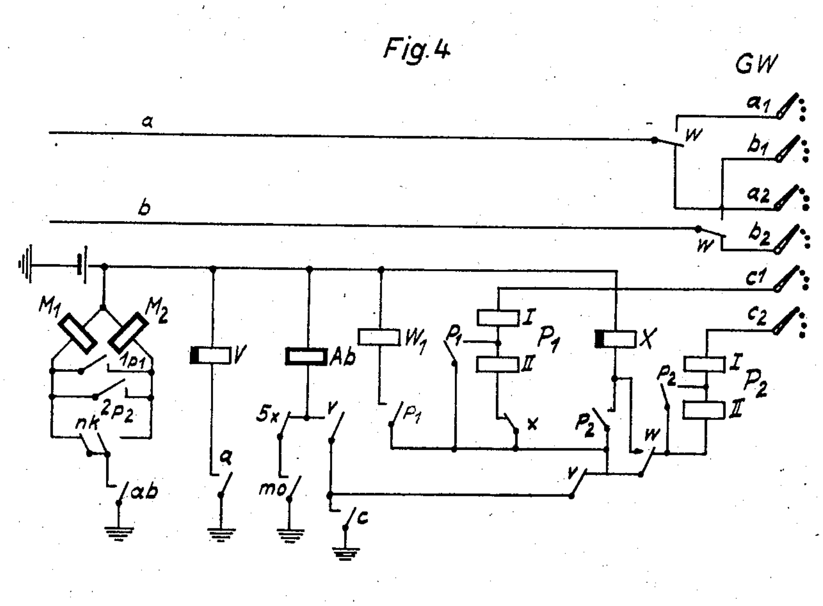

The circuits shown in Figs. 2 to 4 differ from Fig. 1 by the provision of switching control relays functioning as gate relays for extending one or the other line conductor by means of transfer contacts controlled thereby.

For the rest, the testing circuits shown in Figs. 2 to 4 do not differ substantially from the testing circuit shown in Fig. 1.

In the arrangement shown in Fig. 2, the line or impulse receiving relay (not shown) is again in known manner impulsewise energized by the incoming series of dial pulses. Contact *a* is thereby actuated and closes a circuit for the energization of slow-to-release relay V, which remains operated during the series of dial pulses, keeping the motor connected at its contact 1*v*. The decade or tens selection operation is as before controlled by switching means (not shown) at the motor-driven switch, for example, by special wipers and associated contacts of the line relay. After the last dial pulse, relay V releases again, thereby connecting switching control relay W in a circuit extending from +, *c*, *mo*, 2*v*, 2*p*1, W to —. Relay W energized and closes its contacts 2*w* and 4*w* thereby extending the two line conductors respectively to the wipers *a*2, *b*2. Contact 1*w* closes a circuit for the slow-to-release relay X from +, *c*, *mo*. 2*v*, 1*w*, 2*p*2, X to —. The test relay P2 is connected to wiper *c*2 by contact 1*w*. At its contact 1*x* relay X connects ground to the test relay P1 which is connected to wiper *c*1. Relay X, at contacts 3*x* and 4*x*, opens points in the line conductors *a*, *b*. Finally, relay X closes at its contact 2*x*, a circuit for the field magnets M1 and M2 of the motor. As has been described, the field magnets, controlled by cam actuated contacts *nk*, rotates the wipers until one of the two test relays P1 or P2 is energized.

If relay P1 energizes first, responsive to engagement of the wiper *c*1 with the private conductor of an idle line, the switch will be stopped by the closure of contact 1*p*1, and relay W is disconnected by opening the contact 2*p*1. At contact 3*p*1 the low resistance blocking winding I of relay P1 is connected in the test circuit. Upon releasing, relay W extends the two line conductors to the wipers *a*1,

*b*1 over contacts 3*w* and 5w. At contact 1*w* the circuit of relay X and the testing circuit of relay P2 are interrupted. Relay X deenergizes with some delay and extends the two line conductors *a* and *b* at contacts 3*x* and 4*x*.

If test relay P2 energizes first, relay X will be disconnected at contact 2*p*2, and at contact 1*x* the test circuit of relay P1 is opened. Relay W remains operated and at contacts 2*w* and 4*w* maintains the two line conductors connected to the wipers *a*2, *b*2. At contacts 3*x* and 4*x* relay X switches the line conductors *a* and *b* through as before.

If the two wiper sets find idle lines simultaneously, the two test relays P1 and P2 energize simultaneously. Relay P1 interrupts the circuit of relay W at contact 2*p*1. Relay W, which upon releasing extends at its contacts 3*w* and 5*w* the line conductors to the wipers *a*1, *b*1, and opens at contact 1*w* the circuit for test relay P2 and also the circuit for the slow-to-release relay X.

In the arrangement shown in Fig. 3, the switch does not extend the line conductors with a delay controlled by an auxiliary relay; the extension of the line conductors is effected by the wipers themselves by means of a so-called wiper lifting magnet. The latter maintains the line wipers lifted from the bank contacts during the setting operation of the switch; they are brought into engagement with the selected bank contacts only after conclusion of the selection operation. For the rest the circuit of Fig. 3 is identical with that according to Fig. 2.

The incoming dial pulses energize the line relay impulsewise and the switch is consequently set in accordance with the desired decade or tens group. During the series of dial pulses the slow-to-release relay V remains operated. Upon energizing, relay V connects the wiper lifting magnet A*b* at contact 3*v*, so that the magnet lifts the line wipers to keep them out of engagement with the line bank contacts during the selection operation (hunting) of the switch. The motor of the switch is connected through a contact *ab* of the wiper lifting magnet. Upon completion of the dial pulses and release of relay V, the switching control relay W and subsequently the relay X are energized. Relay W connects at contact 1w thes test relay P2, and relay X connects at 1*x* the test relay P1, each to its respective test or private wiper. During the hunting operation, the wiper lifting magnet A*b* remains energized over contact 5*x*. Upon completion of the hunting operation, one of the two test relays P1 or P2 energizes, or, in the case of simultaneous seizure of idle trunks by the two test wipers both test relays P1 and P2 will energize. In either case, relay X releases after some delay, while relay W remains operated only upon energization of test relay P1, but not responsive to energization of test relay P2.

The arrangement according to Fig. 4 represents a reversal of the circuit shown in Fig. 3, inasmuch as the test relays are connected to their test circuits through normal contacts of the switching control relays, while during operation of the test relays the switching control relays are not disconnected but connected. The result is a reversed operation also of the transfer contacts of the gate relay W. The wiper lifting magnet A*b* must be affected in like manner, not by a make contact, but by a normal contact 5*x* of the control relay X. The mode of operation of the circuit will be understood with reference to the description of Fig. 3. The circuit according to Fig. 4 has the advantage that the test relays can be provided solely with make contacts, resulting in a reduced burden on the relays, which is favorable for quicker functioning thereof.

Depending on the connection of the private wipers to the test relays and the cooperating switching control relays, one or the other wiper group of a switch can be given preference, which is switched through upon simultaneous idle testing of trunk lines. For example, if preference is given in one half of the switches of a board to one group of wiper sets, through which for example ten trunks are reached, and in the other half of switches, the other group of wiper sets and hence additional ten lines are reached, there will be obtained an effect corresponding to a crossing or reversal of the trunks and hence a compensation within the entire group.

The above described examples of embodiments of the invention relate to motor-driven switches. The invention may however be applied with equal advantage also to step-by-step switches, in which case only the manner of controlling the switch drive by the test relays would have to be modified. Application of the invention to step-by-step switching mechanisms, which operate at a much lower stepping speed than motor-driven switches anyway, will result in considerable reduction of the hunting time.

Changes may be made within the scope and spirit of the appended claims.

I claim:

1. In a telephone system, a selector switch comprising incoming line and private conductors, two sets of wipers, each set comprising line wipers and a private wiper, motor means for simultaneously moving said sets of wipers, each with respect to a separate level of bank contacts respectively including sets of bank contacts connected respectively with line and private conductors of outgoing trunk lines belonging to one and the same trunk group; a circuit arrangement for controlling the testing operations of the respective private wipers, said circuit arrangement comprising a test relay for each private wiper, an auxiliary relay for each test relay, contact means governed by each auxiliary relay for controlling a point in the circuit of the other test relay, and circuit means for connecting said test relays and said auxiliary relays to effect, responsive to simultaneous energization of said test relays, interruption of the testing circuit of one of said test relays.

2. A system and cooperation of parts according to claim 1, comprising means controlled by each test relay upon actuation thereof for respectively busying a seized idle trunk and for stopping the motor of the corresponding switch, and means controlled by the respective auxiliary relay for extending the incoming line conductors through to the line conductors of the seized trunk.

3. A system and cooperation of parts according to claim 1, wherein said contact means governed by one of said auxiliary relays controls a point in the energizing circuit of the other test relay, said contact means governed by the other one of said auxiliary relays governing a point in the energizing circuit and a point in the busying circuit of the other test relay.

4. A system and cooperation of parts according to claim 1, comprising circuit means for independently energizing said auxiliary relays during the hunting operation of said wipers, means controlled by the operated test relay for disconnecting the other auxiliary relay, and contact means controlled by the disconnected auxiliary relay for extending the incoming line conductors.

5. A system and cooperation of parts according to claim 1, comprising means governed by each auxiliary relay for controlling a switching point in the circuit of the test relay cooperating with the other auxiliary relay, and means governed by each test relay for controlling a switching point in the circuit of the auxiliary relay respectively cooperating therewith.

6. A system and cooperation of parts according to claim 1, comprising means governed by one of said auxiliary relays for switching the incoming line conductors from one to the other set of wipers, means governed solely by the test relay cooperating with said one auxiliary relay for controlling the energizing circuit thereof, and means governed by the other test relay and by said one auxiliary relay and the test relay respectively cooperating therewith for controlling the energization of the other auxiliary relay.

7. A system and cooperation of parts according to claim 1, comprising means governed by one of said auxiliary relays for switching the incoming line conductors from one to the other set of wipers, means governed solely by the test relay cooperating with said one auxiliary relay for controlling the energizing circuit thereof, and means governed by the other test relay and by said one auxiliary relay and the test relay respectively cooperating therewith for controlling the energization of the other auxiliary relay, said other auxiliary relay being a slow-to-release relay, and means governed by said slow-to-release relay upon deenergization thereof for extending the incoming line conductors.

8. A system and cooperation of parts according to claim 1, comprising means governed by one of said auxiliary relays for switching the incoming line conductors from one to the other set of wipers, means governed solely by the test relay cooperating with said one auxiliary relay for controlling the energizing circuit thereof, means governed by the other test relay and by said one auxiliary relay and the test relay respectively cooperating therewith for controlling the energization of the other auxiliary relay, and means governed by said one auxiliary relay upon deenergization thereof at the conclusion of testing for extending the incoming line conductors to one of said sets of wipers.

9. A system and cooperation of parts according to claim 1, comprising means governed by one of said auxiliary relays for switching the incoming line conductors from one to the other set of wipers, means governed solely by the test relay cooperating with said one auxiliary relay for controlling the energizing circuit thereof, means governed by the other test relay and by said one auxiliary relay and the test relay respectively cooperating therewith for controlling the energization of the other auxiliary relay, and means governed by said one auxiliary relay upon energization thereof at the conclusion of testing for extending the incoming line conductors to one of said sets of wipers.

10. A system and cooperation of parts according to claim 2, comprising a magnet and means for energizing it to maintain the line wipers of said sets of wipers out of engagement with the bank contacts during the motion of said wipers relative to said bank contacts, means governed by one of said auxiliary relays for switching the incoming line conductors from one to the other set of wipers, means governed solely by the test relay cooperating with said one auxiliary relay for controlling the energizing circuit thereof, means governed by the other test relay and by said one auxiliary relay and the test relay respectively cooperating therewith for controlling the energization of the other auxiliary relay, and means governed by said one auxiliary relay at the conclusion of the testing operation for deenergizing said magnet to connect the incoming line conductors through at the corresponding line wipers.

11. A system and cooperation of parts according to claim 1, comprising means governed by each auxiliary relay for controlling a switching point in the circuit of the test relay cooperating with the other auxiliary relay, means governed by each test relay for controlling a switching point in the circuit of the auxiliary relay respectively cooperating therewith, contact means governed by said auxiliary relays for connecting the respectively cooperating test relays to the corresponding test circuits after ascertaining an idle trunk, to cause energization of the corresponding test relay, means governed by a test relay upon energization thereof for energizing the respectively cooperating auxiliary relay, and means governed by the corresponding auxiliary relay upon energization thereof for disconnecting the testing circuit for the other test relay.

12. A system and cooperation of parts according to claim 1, comprising means governed by each auxiliary relay for controlling a switching point in the circuit of the test relay cooperating with the other auxiliary relay, means governed by each test relay for controlling a switching point in the circuit of the auxiliary relay respectively cooperating therewith, contact means governed by said auxiliary relays for connecting the respectively cooperating test relays to the corresponding test circuits after ascertaining an idle trunk, to cause energization of the corresponding test relay, means governed by a test relay upon energization thereof for energizing the respectively cooperating auxiliary relay, and means governed by the corresponding auxiliary relay upon energization thereof for disconnecting the testing circuit for the other test relay, the contacts controlled by said test relays being solely contacts which are normally open.

13. A system and cooperation of parts according to claim 1, comprising a plurality of groups of switches having their bank contacts connected in multiple, said auxiliary relays being allotted to different test relays in the respective groups of switches.

14. A system and cooperation of parts according to claim 1, wherein said selector switch is a motor driven switch.

References Cited in the file of this patent

UNITED STATES PATENTS

| | | |
|---|---|---|
| 1,914,384 | Richardson | June 20, 1933 |
| 1,922,192 | Bellamy | Aug. 15, 1933 |
| 2,504,755 | Taylor et al. | Apr. 18, 1950 |